US007937397B2

(12) United States Patent
Pickens

(10) Patent No.: US 7,937,397 B2
(45) Date of Patent: May 3, 2011

(54) APPARATUS AND METHOD FOR TERM CONTEXT MODELING FOR INFORMATION RETRIEVAL

(75) Inventor: Jeremy Pickens, Milpitas, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 345 days.

(21) Appl. No.: 11/508,476

(22) Filed: Aug. 22, 2006

(65) Prior Publication Data

US 2008/0052273 A1    Feb. 28, 2008

(51) Int. Cl.
*G06F 17/30* (2006.01)
*G06F 7/00* (2006.01)
(52) U.S. Cl. ......... 707/750; 707/758; 707/781; 707/917
(58) Field of Classification Search .................. None
See application file for complete search history.

(56) References Cited

U.S. PATENT DOCUMENTS

| 5,404,514 | A  | * | 4/1995  | Kageneck et al. | 707/5  |
|-----------|----|---|---------|-----------------|--------|
| 6,611,825 | B1 | * | 8/2003  | Billheimer et al. | 706/45 |
| 7,295,965 | B2 | * | 11/2007 | Haigh et al. | 704/9 |
| 2004/0024583 | A1 | * | 2/2004 | Freeman | 704/4 |
| 2005/0143971 | A1 | * | 6/2005 | Burstein et al. | 704/4 |

OTHER PUBLICATIONS

Mikhail Bilenko, "Adaptive Duplicate Detection Using Learnable String Similarity Measures," Proceedings of the Ninth ACM SIGKDD International Conference on Knowledge Discovery and Data Mining (KDD-2003), Washington, D.C., p. 39-48, Aug. 2003).*

S.E. Robertson, et al., "Relevance Weighting of Search Terms", *Journal of the American Society for Information Science*, vol. 27, No. 3, May-Jun. 1976, pp. 129-146.
Jay M. Ponte, et al., "A Language Modeling Approach to Information Retrieval", *Proceedings for the ACM SIGIR Conference*, 1998, pp. 275-281, ACM, Melbourne, Australia.
Adam L. Berger, et al., "A Maximum Entropy Approach to Natural Language Processing", *Computational Linguistics*, 1996, pp. 39-71, 22(1), Association for Computational Linguistics.
Stephen Della Pietra, et al., "Inducing Features of Random Fields", *IEEE Transactions on Pattern Analysis and Machine Intelligence*, pp. 380-393, Apr. 1997, vol. 19, No. 4.
Doug Beeferman, et al., "Text Segmentation Using Exponential Models", *Proceedings of the Second Conference on Empirical Methods in Natural Language Processing*, School of Computer Science, Carnegie Mellon University.
Ronald Rosenfield, "A Maximum Entropy Approach to Adaptive Statistical Language Modeling", *Computer, Speech, and Language*, pp. 187-228, May 1996, vol. 10.
Nadia Ghamrawi, et al., "Collective Multi-Label Classification", *Proceedings of CIKM*, Oct. 31-Nov. 5, 2005, pp. 195-200, Bremen, Germany.
M.F. Porter, "An algorithm for suffix stripping", *Program*, vol. 14 No. 3, pp. 130-137, Jul. 1980.

(Continued)

*Primary Examiner* — Greta L Robinson
*Assistant Examiner* — James J Wilcox
(74) *Attorney, Agent, or Firm* — Sughrue Mion, PLLC

(57) ABSTRACT

A novel method for going beyond the observed properties of a keyword, to a model in which the presence of a term in a document is assessed not by looking at the actual occurrence of that term, but by a set of non-independent supporting terms, defining the context. In other words, similarity is determined not by properties of the keyword, but by properties of the keyword's context. This yields a scoring for documents which is useful for ad hoc retrieval and, by extension, any information retrieval task where keyword-based similarity is needed.

26 Claims, 5 Drawing Sheets

Model Term = "forest"

| | | | |
|---|---|---|---|
| 1.3921 | tree | 0.0895 | |
| 1.2945 | rain | 0.0828 | 200 |
| 1.1233 | mountains | 0.0833 | |
| 1.0652 | lake | 0.0727 | |
| 0.791 | acres | 0.0737 | |
| 0.7501 | earth | 0.0597 | |
| 0.7022 | environmental | 0.0598 | |
| 0.623 | camps | 0.0422 | |
| 0.575 | preserve | 0.057 | |
| 0.536 | burns | 0.0456 | |
| 0.4404 | wood | 0.0528 | |
| 0.4337 | nations | 0.033 | |
| 0.3788 | environment | 0.0515 | |
| 0.373 | bear | 0.0383 | |
| 0.3506 | nature | 0.0513 | |
| 0.3419 | memory | 0.0302 | |
| 0.3159 | north | 0.0433 | |
| 0.3123 | spots | 0.0381 | |
| 0.3105 | service | 0.0334 | |
| 0.2983 | green | 0.0466 | |
| 0.2629 | animals | 0.05 | |
| 0.2567 | trail | 0.0435 | |
| 0.2511 | dies | 0.0275 | |
| 0.244 | initiative | 0.0241 | |
| 0.2182 | fired | 0.033 | |
| -0.2317 | hit | 0.0157 | |
| -0.2643 | record | 0.0158 | |
| -0.2877 | city | 0.0222 | |
| -0.3056 | weeks | 0.0181 | |
| -0.6185 | years | 0.0217 | |
| -4.5281 | <null> | 0.017 | |

OTHER PUBLICATIONS

S. E. Robertson, et al., "Okapi at TREC-3", *3rd Annual Text Retrieval Conference*, NIST, Gaithersburg, MD, 1994.

Ellen M. Voorhees, et al., "Overview of the Sixth Text Retrieval Conference (TREC-6)", *Information Processing and Management*, 36(1), pp. 3-35, 2000.

Chana R. Schoenberger, "Out of Context: Paid search is the hottest thing on the Web, yet online ads still struggle to be relevant", Forbes.com, Nov. 29, 2004. http://www.forbes.com/business/global/2004/1129/064.html.

Donald Metzler, et al., "A Markov Random Field Model for Term Dependencies", *28th Annual ACM SIGIR Conference*, pp. 472-479, Aug. 15-19, 2005, Salvador, Brazil.

Victor Lavrenko, et al., "Relevance-Based Language Models", *Proceedings of the ACM SIGIR Conference*, pp. 120-127, Sep. 9-12, 2001, New Orleans, Louisiana, USA.

Ramesh Nallapati, "Discriminative Models for Information Retrieval", *Proceedings of the ACM SIGIR Conference*, Jul. 25-29, 2004, Sheffield, U.K.

* cited by examiner

Model Term = "forest"

| | | |
|---|---|---|
| 1.3921 | tree | 0.0895 |
| 1.2945 | rain | 0.0828 |
| 1.1233 | mountains | 0.0833 |
| 1.0652 | lake | 0.0727 |
| 0.791 | acres | 0.0737 |
| 0.7501 | earth | 0.0597 |
| 0.7022 | environmental | 0.0598 |
| 0.623 | camps | 0.0422 |
| 0.575 | preserve | 0.057 |
| 0.536 | burns | 0.0456 |
| 0.4404 | wood | 0.0528 |
| 0.4337 | nations | 0.033 |
| 0.3788 | environment | 0.0515 |
| 0.373 | bear | 0.0383 |
| 0.3506 | nature | 0.0513 |
| 0.3419 | memory | 0.0302 |
| 0.3159 | north | 0.0433 |
| 0.3123 | spots | 0.0381 |
| 0.3105 | service | 0.0334 |
| 0.2983 | green | 0.0466 |
| 0.2629 | animals | 0.05 |
| 0.2567 | trail | 0.0435 |
| 0.2511 | dies | 0.0275 |
| 0.244 | initiative | 0.0241 |
| 0.2182 | fired | 0.033 |
| -0.2317 | hit | 0.0157 |
| -0.2643 | record | 0.0158 |
| -0.2877 | city | 0.0222 |
| -0.3056 | weeks | 0.0181 |
| -0.6185 | years | 0.0217 |
| -4.5281 | <null> | 0.017 |

Model Term = "home"

| | | |
|---|---|---|
| 0.688 | house | 0.1826 |
| 0.6473 | family | 0.1785 |
| 0.5362 | wife | 0.1179 |
| 0.528 | residence | 0.1278 |
| 0.4604 | property | 0.0825 |
| 0.4593 | hit | 0.1426 |
| 0.442 | game | 0.1503 |
| 0.4388 | single | 0.1274 |
| 0.4049 | roads | 0.1001 |
| 0.403 | walk | 0.1299 |
| 0.358 | saved | 0.1046 |
| 0.3576 | lived | 0.19 |
| 0.3574 | neighborhood | 0.0822 |
| 0.3454 | visiting | 0.1057 |
| 0.3325 | league | 0.1045 |
| 0.3246 | stay | 0.1255 |
| 0.3223 | returns | 0.1459 |
| 0.3219 | buy | 0.1025 |
| 0.3144 | double | 0.0996 |
| 0.3028 | husband | 0.0814 |
| 0.2903 | parents | 0.0955 |
| 0.2635 | night | 0.1638 |
| 0.2567 | mother | 0.1023 |
| 0.2516 | left | 0.1683 |
| 0.2284 | found | 0.152 |
| 0.2276 | county | 0.1452 |
| 0.2245 | seasonings | 0.1377 |
| 0.2152 | days | 0.204 |
| 0.1947 | base | 0.1457 |
| 0.1803 | don | 0.2 |
| -2.6601 | <null> | 0.1842 |

|  | BM25 | TCM-BM25 mixture | %age improvement |
| --- | --- | --- | --- |
| Total number of document over all queries | | | |
| Retrieved | 143,000 | 143,000 | |
| Relevant | 3535 | 3535 | |
| Retrieved \| Relevant | 2239 | 2285 | +2.05†* |
| Interpolated Recall-Precision | | | |
| 0.0 | 0.5696 | 0.6012 | +5.6†* |
| 1.0 | 0.4372 | 0.4604 | +5.3†* |
| 2.0 | 0.3617 | 0.3636 | +0.5 |
| 3.0 | 0.2811 | 0.2755 | -2.0 |
| 4.0 | 0.2256 | 0.2239 | -0.7 |
| 5.0 | 0.1970 | 0.1898 | -3.6 |
| 6.0 | 0.1493 | 0.1481 | -0.8 |
| 7.0 | 0.1241 | 0.1258 | +1.4 |
| 8.0 | 0.0853 | 0.0869 | +1.8 |
| 9.0 | 0.0593 | 0.0596 | +0.6 |
| 1.0 | 0.0482 | 0.0484 | +0.5 |
| Average precision (non-interpolated) over all relevant documents | | | |
| | 0.2133 | 0.2152 | +0.93†* |

APPARATUS AND METHOD FOR TERM CONTEXT MODELING FOR INFORMATION RETRIEVAL

DESCRIPTION OF THE INVENTION

1. Field of the Invention

The present invention relates to techniques for information retrieval and more specifically to context-based similarity algorithms.

2. Description of the Related Art

Recent developments in information retrieval have taken advantage of advances in machine learning and statistical modeling. As techniques for analyzing and finding relationships in unstructured text are refined, so is the application of these techniques to the problem of organizing and retrieving information.

From its earliest days, information retrieval has been viewed as a binary classification problem; wherein documents were ranked by the extent to which they are relevant or not relevant to a query. The relevance is determined by the presence of absence of target terms in documents. However, as one of ordinary skill in the art would appreciate, such approach has very significant drawbacks.

According to Forbes magazine, there is an apocryphal story about a "banner ad for luggage sellers served up next to a news article about a dead body found in a suitcase." Because things like this do happen, and will continue to happen, because the advertising programs rely on observable ad term occurrences. Thus, in accordance with the existing technology, the term "context" means the filter that an advertiser has set up as a trigger, to "fire" the display of an ad, is more or less "matched" by some content in the document. The match might include things like term frequencies and proximities, but in general ads get displayed based on actual observations of ad terms. For example, if an advertising filter is defined by the term "luggage", and the document on which that ad might be shown contains fourteen occurrences of the term "luggage", then it is probably assumed to be a good match.

Therefore, the existing techniques which use term frequency as the basis of their similarity scores are deficient in their ability to provide context-based methods for computing similarity between text entities. Specifically, what is needed is an algorithm that determines textual similarity not by comparing keywords, but by comparing contexts that are appropriate to those keywords.

SUMMARY OF THE INVENTION

The inventive methodology is directed to methods and systems that substantially obviate one or more of the above and other problems associated with conventional techniques for computing similarity between text entities.

In accordance with one aspect of the inventive concept, there is provided a method, a computer programming product and a computerized system for computing similarity between a first text object and a second text object. The aspect of the inventive concept involves using the first text object to derive a context model associated with the first text object; and using the derived context model to compute similarity between the first text object and the second text object.

In accordance with another aspect of the inventive concept, there is provided a method, a computer programming product and a computerized system for automatic induction of a context model for a term. The aspect of the inventive involves selecting a feature set to contain only a feature for the term with no context; setting the initial weight to one for the feature; updating the weight for the feature; and performing feature induction.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates further exemplary embodiment of a term context model.

FIG. 4 presents results of experimental testing of an embodiment of the inventive model.

DETAILED DESCRIPTION

Figure 1:
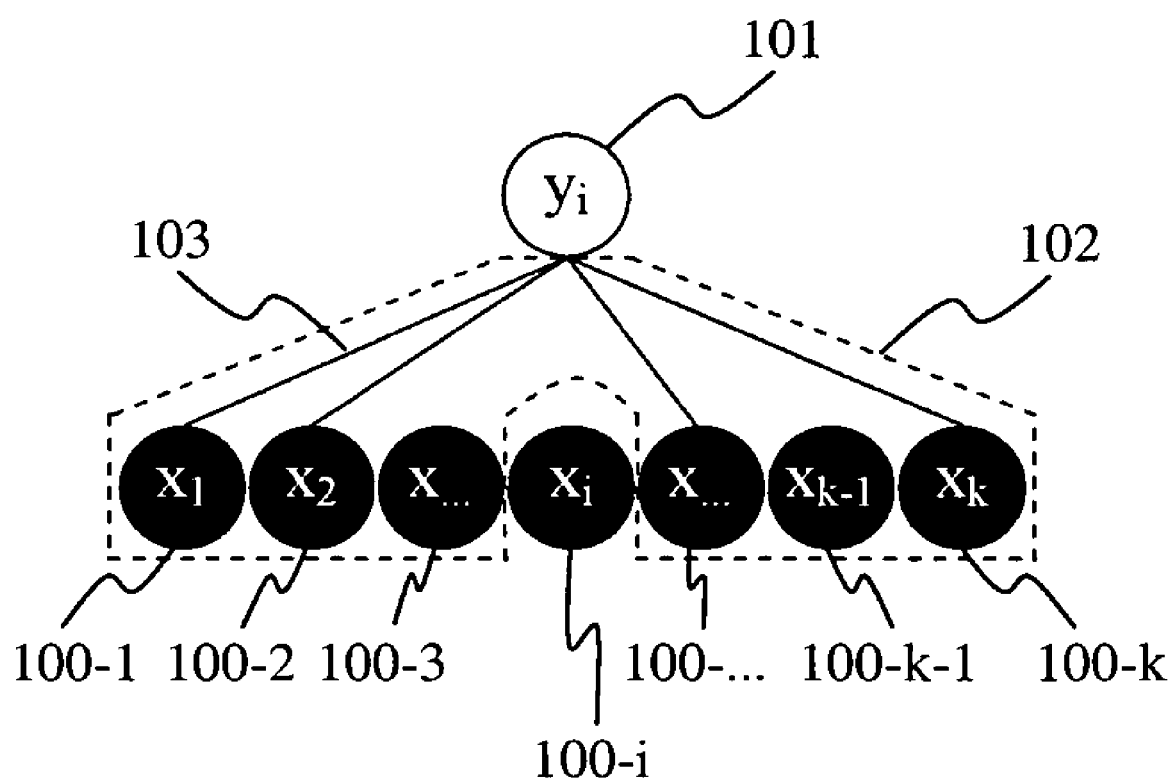
FIG. 1 illustrates an exemplary embodiment of a term context model for a single term.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Rather than focusing on the frequency of a term, an embodiment of the inventive technique determines whether the target term is a good fit for the document using other techniques that simply observing statistics of that term in the target document. In other words, one aspect of the inventive technique involves prediction of the term presence from the context only, based on training of the algorithm using a large collection of text. Instead of using the observed occurrence of a term in a document, the inventive technique predicts whether or not that term should be present, based on the context given by the rest of the document. For this reason, one embodiment of the inventive technique involves building a term context model.

As stated above, the aforesaid term context model quantitatively predicts the occurrence of the target term in the target document. In various embodiments of the invention, this model is built using words, phrases or even entire sentences. As would be appreciated by those of skill in the art, other methods for building the context models may also be utilized. In other words, the system in accordance with an embodiment of the inventive concept checks the target document for words of phrases other than the target term, but which predict the occurrence or non-occurrence of the target term in the document.

In accordance with an embodiment of the inventive concept, models of the ad words are first created using a broader collection or vocabulary of words. Specifically, the inventive system determines which (support-feature based) contexts those words often find themselves in, and what contexts they do not find themselves in, across the collection as a whole. Thus, when a particular document does not contain a context that supports belief in the ad-triggering statement, it won't trigger that statement, even if all the ad words "match". Therefore, even though a particular news story might contain the term "luggage" fourteen times over, the context model for "luggage" does not include features such as "dead bodies" and "police" and many other such terms from the article. Thus, the luggage ad would not be triggered by the inventive system.

Technical Details

An embodiment of the inventive methodology is based, at least in part, on the maximum entropy calculation, which may also be characterized as a "0th order" conditional random field. This model is described in A. L. Berger, S. A. Della Pietra, and V. J. Della Pietra, A maximum entropy approach to natural language processing. Computational Linguistics, 22(1):39-71, 1996; S. Della Pietra, V. Della Pietra, and J. Lafferty, Inducing features of random fields. In IEEE Transactions on Pattern Analysis and Machine Intelligence, 19, pages 380-393, 1997, D. Beeferman, A. Berger, and J. Lafferty, Text segmentation using exponential models. In Proceedings of the Second Conference on Empirical Methods in Natural Language Processing; R. Rosenfeld, A maximum entropy approach to adaptive statistical language modeling. Computer, Speech, and Language, 10:187-228, 1996; and A. McCallum and N. Ghamrawi. Collective multi-label text classification, In Proceedings of CIKM, pages 195-200, Bremen, Germany, 2005, all of which are incorporated herein by reference in their entirety.

The inventive information retrieval technique will be illustrated herein with reference to the following example. Suppose there is provided a lexicon of k terms extracted from some corpus of interest. In accordance with the inventive technique, two binary random variables, $x_i$ and $y_i$ are created for each i-th term in the lexicon. Specifically, $x_i$ is created for the observed value of that term, and $y_i$ for the unobserved, or hidden value. When given an actual document d from the aforesaid corpus, the set of observed variables $x_1 \ldots x_k$ are instantiated by assigning a value of "0" when the frequency of the term is zero in that document, and a value of "1" when the frequency is greater than zero. Now, for every unobserved term $y_i$ the context $H_i$ is defined as the set of observable variables for all terms in the vocabulary other than the i-th term itself:

$$H_i = \{x_j : i \neq j\}$$

In accordance with an embodiment of the inventive concept, terms in $H_i$ are the only ones that are being examined when the prediction regarding $y_i$ is made. In other words, it may be assumed that the probability of term $y_i$ occurring in d is completely determined by $H_i$ in the aforesaid model. This also means that each term $y_i$ is conditionally independent of all other terms $y_{j \neq i}$, given $x_1 \ldots x_k$. In other words, a "bag of term-context-models" is created. However, it is important to stress that it is not assumed that the conditioning variables are all independent; and arbitrary dependencies within the $H_i$ context are still allowed.

A well-known advantage of the random field framework is that it allows arbitrary dependencies between the target $y_i$ and its context $H_i$. The features forming the context may be simple or complex, based on everything from term frequencies, to hyperlinked text, to the locations of commas. Therefore, one of ordinary skill in the art will appreciate that the present invention is not limited to any specific type of features. Therefore, the inventive model allows features of various types. However, for exemplary purposes only the allowed dependencies are deliberately restricted to binary questions of the form: "Does term $x_j$ occur in this document?".

In accordance with another embodiment of the inventive approach, a question may be asked about some subset S of the terms in $H_i$. The answer to a question of this form will be called the feature function $f_S$, and S will be referred to as the support of f. For a given support $S \in H_i$, the feature function $f_S$ is defined as the conjunction of answers about the individual terms in $x_j \in S$:

$$f_S(y_i, H_i) = y_i \prod_{x_j \in S} x_j$$

Defined in this manner, the feature functions are always Boolean and equal to 1 if all the terms defined by S occur in the document. A feature function always includes the target term $y_i$. This is not a fallacy, because $y_j$ will never actually be considered a part of its own context. Presence of $y_i$ in the feature serves only to tie the occurrences of terms in S to the term $y_i$.

FIG. 1 illustrates an example of a term context model for a single term $y_i$. Nodes 100-1 through 100-k are the observable variables. Node 101 is the hidden variable for the term $y_i$ whose context is being modeled. The variables inside the dotted area 102 are the context $H_i$. An exemplary set of arcs 103 are shown, wherein an arc 103 represents a single feature function $f_S$ whose connected nodes are the support S.

Parametric Form

There are a number of different forms that can be chosen for computing the probabilities $P(y_i|H_i)$. An embodiment of the invention uses a natural formulation of the distribution for random fields that is given by the maximum-entropy framework. Suppose there is provided a set F of feature functions that define the structure of the field. The maximum-entropy principle states that there should be selected the parametric form that is: (i) consistent with the structure imposed by F and (ii) makes the least amount of unwarranted assumptions— that is the most uniform of all distributions consistent with F. The family of functions that satisfies these two criteria is the exponential (or log-linear) family, expressed as:

$$P(y_i | H_i) = \frac{1}{Z_i} \exp\left\{ \sum_f \lambda_f f(y_i, H_i) \right\}$$

In the equation above, the set of scalars $\Lambda = \{\lambda_f : f \in F\}$ are the Lagrange multipliers for the set of structural constraints F. $Z_i$ is the normalization constant that ensures that our distribution sums to unity over all possible values of $y_i$:

$$Z_i = \sum_{y_i} \exp\left\{\sum_f \lambda_f f(y_i, H_i)\right\}$$

As would be appreciated by those of skill in the art, for a general random field, $Z_i$ is exceptionally hard to compute because it involves summation over all possible configurations of the system, which is exponential in the number of hidden variables. However, in the embodiment of the invention described herein, the controlling assumption of no dependencies between hidden variables $y_1 \ldots y_k$ makes computation of the partition function extremely simple: $Z_i$ only needs to be computed for $y_i=0$ and $y_i=1$.

Objective Function

The description below will illustrate how to develop a probability distribution $P(y_i|H_i)$ that will accurately predict the presence of term $y_i$ in a document. There exist a number of different measures that could indicate the quality of prediction. The following description focuses on one of the simplest—log-likelihood of the training data. As would be appreciated by those of skill in the art, other suitable measures can be used as well. Given a training set T of documents d the log-likelihood is simply the average logarithm of the probability of producing term i in T:

$$L_{\hat{P}} = \frac{1}{|T|} \log \prod_{d=1}^{T} \hat{P}(y_i(d) | H_i(d))$$

Feature Induction

It should be noted that the described model in accordance with the embodiment of the invention depends on two assumptions. The first and foremost is the structure of the field F, represented as a set of constraints or feature functions f∈ F. These constraints represent most significant dependencies between the variables of the field. The second factor that is being determined is the set of weights $\Lambda=\{\lambda_f\}$, one for each feature f∈F. It is known that $\Lambda$ and F are intimately intertwined and there is a need to learn them simultaneously, but for the sake of clarity the discussion is split into two sections. This section will describe how the structure F of the field can be incrementally induced, starting with a very flat, meaningless structure and generalize to more interesting relationships.

The field induction procedure closely follows the algorithm described in S. Della Pietra, V. Della Pietra, and J. Lafferty, Inducing features of random fields, In IEEE Transactions on Pattern Analysis and Machine Intelligence, 19, pages 380-393, 1997, incorporated herein by reference in its entirety. The primary difference being that the embodiment of the invention described herein deals with a conditional field, whereas the aforesaid Della Pietra et al. use a joint model. Therefore, we start with a field that contains only that term without any dependencies: $F^0=\{y_i\}$. We will incrementally update F by adding the features g that result in the greatest improvement in the objective function.

Suppose $F^k=\{f_s\}$ is the current field structure. Also assume that the corresponding weights $\Lambda^k$ are optimized with respect to $F^k$. We would like to add to $F^k$ a new feature g that will allow to further increase the likelihood of the training data. In order to do that we first need to form a set of candidate features G that could be added. We define G to be the set of all single term extensions of the current structure F:

$$G=\{f_s \cdot x_j | f_s \in F, j \neq i\}$$

In other words, we form new candidate features g taking an existing feature f and attaching a single observable term $x_j$. Naturally, we do not include as candidates any features that are already members of F. Now, following the reasoning of Della Pietra, we would like to pick a candidate that will result in the maximum improvement in the objective function.

First, let $\tilde{E}[g]$ denote the empirical or target expected value of g, which is simply how often (i.e. in how many different documents) the feature actually occurs in the training data T. Similarly, our estimate $\hat{P}(y_i \uparrow H_i)$ gives rise to the predicted expectation $\hat{E}[g]$ for the function g. Predicted expected value is simply how often our model "thinks" that g should occur in the training set. Now, suppose that previous log-likelihood based only on $F^k$ was $L_{\hat{P}}$. If we add a feature g weighted by the multiplier $\alpha$, the new likelihood of the training data would be:

$$L_{\hat{P}+\{\alpha g\}} = L_{\hat{P}} + \alpha \tilde{E}[g] - \log \hat{E}[e^{\alpha g}]$$

As the described feature functions are binary, the weight $\alpha$ can be determined in closed form by differentiating the new log-likelihood $L_{\hat{P}+[\alpha g]}$ with respect to $\alpha$ and finding the root of the derivative:

$$\alpha = \log\left[\frac{\tilde{E}[g](1-\hat{E}[g])}{\hat{E}[g](1-\tilde{E}[g])}\right]$$

Knowing $\alpha$ also allows us to compute the resulting improvement, or gain, in log-likelihood in closed form:

$$\text{Gain} = \tilde{E}[g]\log\frac{\tilde{E}[g]}{\hat{E}[g]} + (1-\tilde{E}[g])\log\frac{(1-\tilde{E}[g])}{(1-\hat{E}[g])}$$

Parameter Estimation

In the previous section we described how we can automatically induce the structure of a random field by incrementally adding the most promising candidate feature g∈ G. We did not discuss the effect of adding g on the weights of other features already in the field. Since the features f∈ F are not independent of each other, adding a new feature will affect the balance of existing features, and therefore the objective function. We may be able to further improve the objective by re-optimizing the weights for all functions that are now in the field.

Assume now that the structure F contains all the desired features. We adjust the set of weights $\Lambda$ so that the objective function $L_{\hat{P}}$ is maximized by computing the partial derivatives of $L_{\hat{P}}$ with respect to each weight $\lambda_f$, with the intention of driving these derivatives to zero. There is no closed-form solution for setting the weights to their optimal values, so we utilize an iterative procedure, such as gradient descent. The learning procedure is fairly expensive. However, learning is guaranteed to converge to the global optimum; the objective function is ∩-convex with respect to the weights $\lambda_f$.

Field Induction Algorithm

Now, the components of the previous subsections will be brought together into one algorithm for automatic induction of a context model for term yi:

(1) Initialization
  a. Select the feature set F0 to contain only the feature for the term itself, with no context: $F^0=\{y_i\}$;
  b. Set the initial weight $\lambda_f=1$ for this feature.

(2) Weight Update
a. Calculate the gradient and adjust $\lambda_f$ a small step in the direction of the gradient;
b. Repeat (a) until a predetermined condition is met (e.g. for n iterations, or until there is no noticeable change in likelihood, etc.).
(3) Feature Induction
a. Enumerate the set of candidate features;
b. For every candidate g, compute the optimal weight $\alpha_g$;
c. For every candidate g, compute the information gain, obtainable if g were added to the set of features F;
d. Pick the candidate g that yields the highest gain, add it to F, and set $\lambda_f = \alpha$;
e. Return to step (2), until a predetermined condition is met (e.g. for n iterations, or until there is no noticeable change in likelihood, etc.) If this condition is met, return F and $\Lambda$ as the model.

Final Details

While the general model creation algorithm is described above, for evaluation a few limitations had to be imposed due to the intense computational resources required. The first limitation is that step (2b) is done 12 times, and step (3e) is done 30 times, inducing a total of 30 features.

The second limitation is on the candidate feature vocabulary $x_1 \ldots x_k$. Rather than using the entire vocabulary, we use the 500 terms with the highest document frequency, which also occur at least once with the target term $y_i$. This subset is of course different for every $y_i$. The 30 best features are learned from this candidate set.

The final limitation that is being imposed is the allowable size of the feature support. Recall that a feature may include any number of observable terms $x_j$. While we have done some exploratory runs allowing two and three support terms, the retrieval results presented in a later section were done using models limited to features with a single support term. The general model does allow more.

It should also be noted that an embodiment of the inventive method stems and conflates terms using the Porter stemmer, so that there is a single variable $x_i$ (as well as a single variable $y_i$) for all terms that share the same root, i.e. car/cars. The aforesaid Porter stemmer is described in detail in M. Porter, An algorithm for suffix stripping, *Program*, 14:130-137, 1980, incorporated herein in its entirety. It should be noted that it is not desirable to have "cars" to be a support feature in the term context model of "car", as this somewhat defeats the purpose of learning a good general context model.

Model Examples

Figure 3:
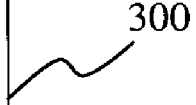
FIG. 3 illustrates further exemplary embodiment of a term context model.

Two examples of term context models are presented in tables 200 and 300 shown in FIGS. 2 and 3, respectively. These models were trained on approximately 131,000 Los Angeles Times newspaper articles. In the left hand column of the tables 200 and 300 is the A weight assigned to the corresponding feature. The middle column contains the support feature that helps predict the model term. And for comparison, the right column contains the standard co-occurrence value between the support feature and the model term. Negative feature weights mean that the presence of that feature is good indication that the model term should not be present in a document. As could be seen from FIG. 3, the inventive model captures not just one, but two meanings of the model term home: "house" and "baseball".

General Nature of the Approach

The technical details above described one particular type of term context model, parameterized in a number of ways such as the number of features induced, the size of the features induced, features based on Boolean term presence, features induced greedily, by information gain, "terms" defined as singleton words, and so on.

Initially, some characteristics need to be chosen in order to demonstrate the effectiveness of the model. However, the inventive approach is more general than this. For example, the inventive approach supports features that may include any real-valued functions of the context, not just Boolean support term presence. Features may be induced by methods other than information gain. More than one feature per iteration may be added. In fact, one could even add all n features to the model during the first iteration, and then spend the rest of the time learning and rebalancing the weights. The embodiment of the inventive approach is characterized by using the aforesaid features to calculate text similarities.

Self-triggers could be allowed, as long as they are not used as labeled training data. E.g. if "giraffe" is the term we are trying to predict, and "giraffe occurs in this document" is a support function, then a document would have to contain at least two occurrences of "giraffe" in order for it to be a positive data point for "giraffe", as the first occurrence of the terms should get "swallowed up" by the support function. Similarly, if the support function is "giraffe occurs 4 times in this document", then there need to be at least 5 occurrences of "giraffe" for it to be a positive training instance, as the first four get swallowed up by the support function.

Various embodiments of the inventive methodology may use more than or less than 30 features. However, one of the novelties of the described approach is that not all possible features (e.g. the entire vocabulary of terms from a collection) are being used. Part of what makes the described approach novel is that by not overfitting the inventive model to the data, it is possible to capture occurrences of terms that are more contextually "central" than others.

It should be noted that "context" may be defined as passages within a document, rather than an entire document. Or, if the application is streaming news off a wire, context may be defined as the previous n news articles, or all the news articles in the previous n days. It is not limited to document boundaries. The inventive context model may be also trained using a set of data, which may be personalized by the user using any suitable criteria.

"Terms" are not necessarily single words. For example, a phrase could be considered a term, e.g. "New York" is a single term, not two terms. In this sense, a term really is any standalone, index-able entity, something that is either found or not found in a document. Therefore, any term, or combination of terms, or negation of terms that yields a Boolean match may be used as the prediction value for our context models.

For example, one could train a model for the conjunct of two words: {book AND binding}. This would match any time the terms "book" and "binding" were both found in the same document. One could also train a model for a single phrase term {"book binding"}. This would match any time both words are found, contiguously and in the same order. One could train a model for the disjunct of terms, such as {unix OR linux OR MacOS}. One could train a model with negated terms, such as {"operating systems" AND NOT Windows}.

Therefore, the term context models describe "text-based Boolean statement" context models. The inventive methodology provides mechanism for discovering, modeling and utilizing the contexts of any arbitrary textual Boolean statement.

In the section below, there will be provided evaluation of the term context model that shows its usefulness, by applying it to ad hoc document retrieval. However, the inventive term context models may be used as a method for determining textual similarity in any place that normal, term occurrence approaches are used. This includes not only ad hoc retrieval, but also things such as document routing and filtering, and topic detection and tracking, to name just a few. Recommendation systems (such as Palbar) are another area in which this could be used. It should also be specifically mentioned that the inventive methodology for determining textual similarity may be incorporated into online advertising, such as Google's AdSense, Yahoo's Ad Central, and Microsoft's AdCenter.

Evaluation

After the framework for creating context models for terms has been created, it will be evaluated by applying it to the task of ad hoc information retrieval. This is not the only application of this framework, but it is one in which the value of an embodiment of the inventive method may be demonstrated.

Document-Query Scoring using Context Models

Ad hoc retrieval works as follows: the inventive system calculates a similarity measurement between a user query and every document in a collection. Documents are then sorted by this score, and presented to the user. Systems are compared by examining the ranks of documents that are relevant to a user's information need. If one system has more relevant documents at higher ranks than another, it is considered better.

The term context models in accordance with an embodiment of the inventive methodology is used as a technique for estimating a query-document similarity score, which is then used to enhance the retrieval process. For each query term and each document in the collection, the degree to which that query term's context model believes it should be present in the document is calculated. As context models are assumes to be independent of each other, these probabilities may be combined through multiplication. Therefore, the probability score on document d, for query term q, is:

$$TCM(q,d) = \hat{P}_{i=q}(q|H_q(d))$$

Note that these calculations are performed on the exact same collection on which the model is trained. This is not a fallacy. Because the model does not include features for the entire vocabulary the model is not being overfit to the collection. By using only the top 30 features, the features that yield the highest information gain while constructing the model, the embodiment of the inventive method in effect captures the 30 most salient aspects of a term.

There will be occurrences of a term that are irregular, or "out of context", as trained on the collection as a whole. Such occurrences will have lower probability than occurrences that are more contextually standard. Thus, the model may assign a low probability for a term in a document, even if the term frequency of that term is high. There will also be other documents in which the frequency for a term is low, but the context-based probability in that document will be high. Ideally, documents in which both the context-based probability, as well as the actual tf, are high will be documents which truly meet a user's information need.

Integrating Context Model Scores with Existing Methods

The model in accordance with an embodiment of the inventive concept, as a stand-alone ranking function, is not enough for proper retrieval. Term frequencies and document frequencies are still necessary. But, as mentioned previously, documents with a high term frequency and a low context score will not do as well as documents with a high term frequency and a high context score. Context model scores serve as a method for enhancing already good retrieval results.

To this end we begin with a retrieval algorithm known as Okapi BM25 described in detail in S. Robertson, S. Walker, S. Jones, M. Hancock-Beaulieu, and M. Gatford. Okapi at TREC-3, In $3^{rd}$ annual Text Retrieval Conference, NIST, Gaithersburg, Md., 1994, incorporated herein in its entirety. This is a well-known and highly-performing algorithm, with consistently among the best results in standard evaluation sets such as TREC. The aforesaid TREC evaluation set is described in detail in E. Voorhees and D. Harman, Overview of the sixth text retrieval conference (TREC-6), *Information Processing and Management*, 36(1):3-35, 2000, incorporated herein in its entirety. If it can be shown that an embodiment of the inventive methodology improves upon BM25, the value of the inventive technique will be established.

The goal is to enhance BM25 with the somewhat orthogonal information provided by the context models. The idea is that the BM25 approach, which is primarily tf-based, is going to give a somewhat different ranking than the TCM approach, which is context-based. The "mistakes" that BM25 makes are not the same as those made by TCM, and vice versa. When the scores provided by both approaches are fused, the relevant documents should percolate to the top, while the spurious matches should drop out. While many fusion techniques are available, a simple linear combination of the scores was performed, where TCM(q, d) and BM25(q, d) are the scores for the term context model and BM25, using query term q on document d, respectively.

$$CombinedScore(d) = \sum_{q \in Q} \lambda \cdot TCM(q, d) + (1 - \lambda) \cdot BM25(q, d)$$

Main Experiment

The standard TREC datasets, well known to persons of skill in the art have been used to evaluate the models. The experiments consist of 150 queries, using only the titles for TREC ad hoc topics 301 to 450. The models have been built for each of the query terms using the approximately 131,000 documents from the LA Times in TREC volume 5. 150 queries were run on this same corpus. (Note that, in this corpus, only 143 of the 150 queries had relevance documents, so in truth we used only 143 queries for the aforesaid experiments. However, this is still far greater than the standard amount of 50 queries used to establish statistical significance.)

An astute observer might find fault with the lack of split between testing and training corpora. We feel this poses no more problem than using an idf weight computed (trained) on the same corpus one is searching, or a tf weight computed (trained) on the same document one is searching. These models are not meant to represent universal truth; they are only meant to capture certain discriminating characteristics of the very corpus they will be used to search. Stated another way, the prediction quality of the models is not being evaluated. If that were the case, the experiment would need to be split into testing and training. Instead, the models are being used to improve retrieval. Thus, the statistics of the same corpus as the one that is being searched should be used.

The results are shown in the table 400 of FIG. 4, with $\lambda$ set to 0.5. The highest gains in precision are the top of the ranked lists. These gains are 5-6% and are statistically significant. It is believed that this increase is happening because the context models give more weight to contextually "central" usages of a term, weeding out some of the higher term frequency documents whose contexts do not support that term. Further analysis is needed, but this is the result that was expected and it demonstrates that the inventive approach is justified.

It should be also mentioned that the obtained results are quite robust with respect to the mixing parameter, $\lambda$. The mixture weights ranging in stepwise 0.1 intervals from 0.0 to 1.0 have been tested. Statistically significant improvements across almost all levels of precision and recall were obtained using λ ranging from 0.3 to 0.8, with the best mixture at 0.7. In fact, using the best mixture weight, we obtained +7.1% at 0.0 interpolated recall, +4.08% mean average precision, and +5.05% Retrieved|Relevant. Therefore, rather than tune the mixing parameter, the "maximum entropy" value of λ=0.5 has been chosen to demonstrate the robustness of the inventive approach, as seen in table 400 shown in FIG. 4.

In practical terms, this means that BM25 offers approximately 2.5 relevant documents in the top 10. With the TCM mixture, that number rises to 2.7. For every five queries done by a user, there will be an additional relevant document in the top 10. While these results are modest, they are nevertheless statistically significant. And given the fact that many users perform dozens of searches every day, improving 1 in 5 queries in a noticeable way is a big deal. The search engine company Google has a rule of thumb that if a project or feature impacts 5% of their user base, they will add it to (or integrate it with) their search engine. On the other hand, the embodiment inventive method impacts 20% of the users. Every 1 in 5 queries issued will have a noticeable improvement in the results.

Additional Experiment

As one final piece of evidence for the value of the inventive method, it has been evaluated using a sub-experiment in which only the relevant documents in which no query terms were present have been looked at. LA Times contains 489 relevant documents spread across 66 queries that have zero terms in common with the query. Using tf-based approaches does not work; only 1 of the 489 relevant documents rank in the top 1000 using BM25. Further, a language model that had been smoothed using the normalized collection frequency of the missing query terms has even been tested. That fails as well (also exactly 1 of the 489 relevant documents in the top 1000) because all documents with no query terms are smoothed equally, with no regard to context, which has no effect on the relative rankings of documents.

However, using just the raw TCM approach, it was possible to pull 82 of the 489 relevant documents into the top 1000, 24 of those into the top 30, and 7 of those into the top 10. 78% of the remaining documents were also improved, from ranks in the 60,000 s to the 1000 s. These improvements are too small and too few to justify using TCM as a stand-alone ranking algorithm. However, they do show that the inventive models provide a different method for document ranking than tf-based approaches.

Exemplary Computerized System

Figure 5:
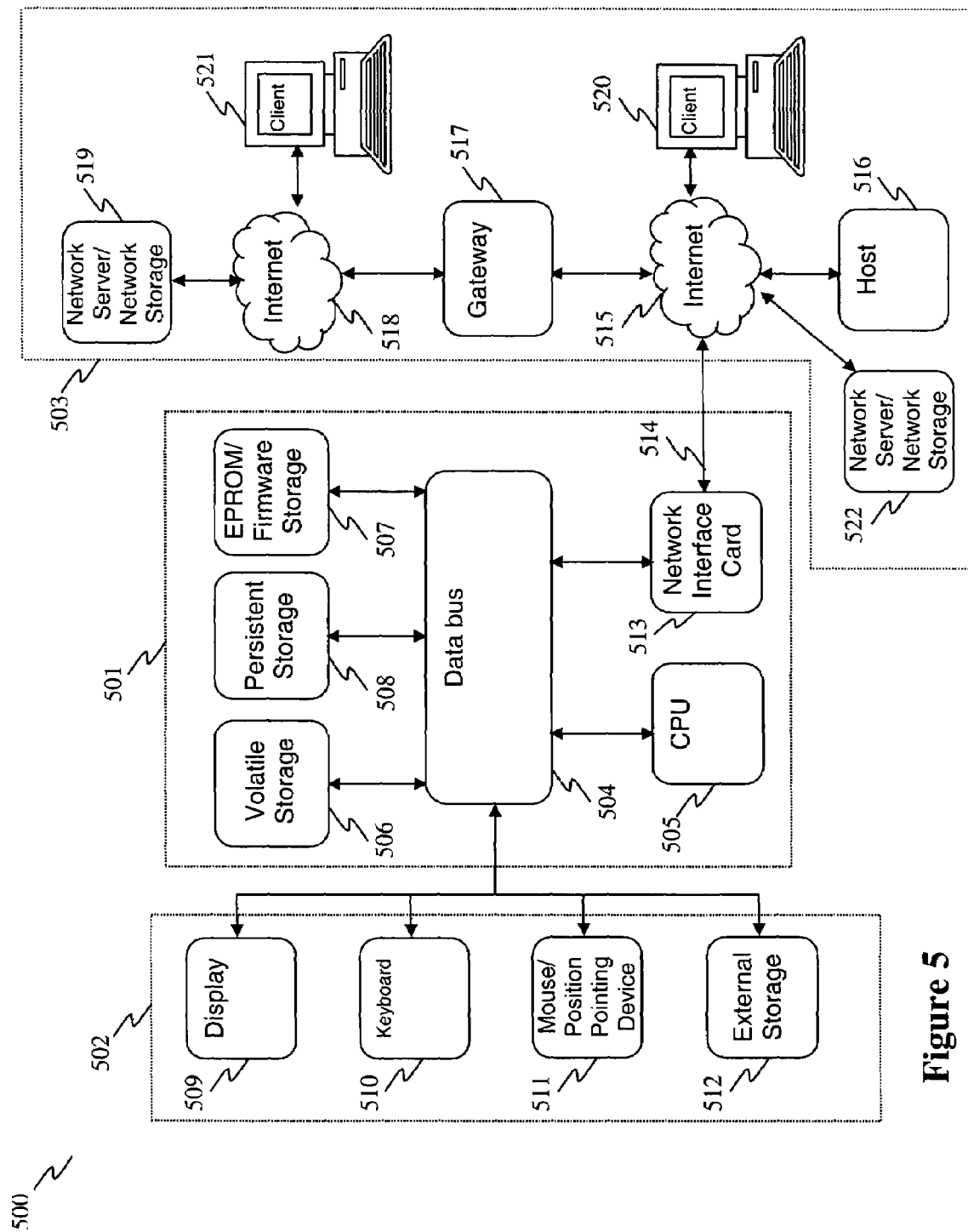
FIG. 5 illustrates an exemplary embodiment of a computer platform upon which the inventive system may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 504 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 504 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 504 and for controlling cursor movement on display 509. This input device typically has two degrees of freedom in two axes, a first axis (e.g., x) and a second axis (e.g., y), that allows the device to specify positions in a plane.

An external storage device 512 may be connected to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is connected to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 514 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 514 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution. In this manner, computer system 501 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A computer implemented method implemented within a computer system comprising a memory and a CPU for predicting if a model term is contextually related to a given text object, the method comprising:

utilizing the memory and the CPU for deriving a context model for the model term; wherein the context model is constructed by training the model term with a collection of documents; wherein the context model comprises a relationship of a set of support features extracted from the collection of documents and multiple sets of weights;

wherein each text object in the set of support features corresponds to a weight in a first set of weights, each weight in the first set of weights being a contextual score between the model term and each support feature in the set of support features, each contextual score being based on a contextual correlation between the model term and each support feature in the set of support features, wherein a high correlation would indicate high contextual relevance and a low correlation would indicate low contextual relevance;

wherein each support feature in the set of support features corresponds to a weight in a second set of weights, each weight in the second set of weights being a co-occurrence score between the model term and each support feature in the set of support features, each co-occurrence score indicating a frequency of the model term occurring with each support feature in the set of support features;

utilizing the memory and the CPU for applying the context model to the given text object; and utilizing the memory and the CPU for obtaining a context model score from the application of the context model to the given text object, wherein the context model score indicates the likelihood of the model term being contextually related to the given text object.

2. The computer implemented method of claim 1, wherein the model term comprises at least one keyword.

3. The computer implemented method of claim 1, wherein the model term comprises at least one phrase.

4. The computer implemented method of claim 1, wherein the set of support features comprises at least one term.

5. The computer implemented method of claim 1, wherein the set of support features comprises multiple terms.

6. The computer implemented method of claim 1, wherein the set of support features comprises at least one phrase.

7. The computer implemented method of claim 1, wherein the set of support features comprises multiple phrases.

8. The computer implemented method of claim 1, wherein the set of support features comprises at least one keyword and at least one phrase.

9. The computer implemented method of claim 1, wherein the context model comprises at least one term proximity condition predicting the occurrence of the first text object within the second text object.

10. The computer implemented method of claim 1, wherein the context model comprises at least one term relationship condition predicting the occurrence of the first text object within the second text object.

11. The computer implemented method of claim 1, further comprising retrieving at least one document based on the application of the context model.

12. The computer implemented method of claim 11, further comprising ranking the retrieved documents based on the application of the context model.

13. A computer implemented method implemented within a computer system comprising a memory and a CPU for automatic induction of a context model for a model term, the method comprising:
 a. utilizing the memory and the CPU for selecting a feature set to contain only a feature for the term with no context;
 b. utilizing the memory and the CPU for setting the initial weight to one for the feature;
 c. utilizing the memory and the CPU for updating the weight for he feature;
 d. utilizing the memory and the CPU for performing feature induction; and
 e. utilizing the memory and the CPU for creating a context model comprising a relationship of a set of weights and a set of support features; wherein each support feature in the set of support features corresponds to a weight in the set of weights, each weight indicating a contextual score between the model term and each support feature in the set of support features, each contextual score being based on a contextual correlation between the model term and each support feature in the set of support features, wherein a high correlation would indicate high contextual relevance and a low correlation would indicate low contextual relevance;
 wherein each support feature in the set of support features corresponds to a weight in a second set of weights, each weight in the second set of weights being a co-occurrence score between the model term and each support feature in the set of support features, each co-occurrence score indicating a frequency of the model term occurring with each support feature in the set of support features;
 wherein updating the weight in the first set of weights for the feature comprises:
  i. Calculating a gradient and adjusting the initial weight a small step in a direction of the gradient; and
  Repeating (a) until a predetermined condition is met.

14. The computer implemented method of claim 13, wherein performing the feature induction comprises:
 i. Enumerating a set of candidate features;
 ii. For each of the set of candidate features, computing an optimal weight;
 iii. For each of the set of the candidate features, computing an information gain by adding each of the set of the candidate features to the feature set;
 iv. Picking a candidate feature of the set of the candidate features, which yields a highest gain, and adding the candidate feature to the feature set; and
 v. Returning to step (c), until a predetermined condition is met.

15. A physical computer readable medium storing a computer programming product causing a computer to execute a process for predicting if a model term is contextually related to a given text object, the process comprising:
 deriving a context model for a model term; wherein the context model is constructed by analysis by training the model term with a collection of documents; wherein the context model comprises a relationship of a set of support features and multiple sets of weights; and
 wherein each support feature in the set of support features corresponds to a weight in a first set of weights, each weight in the first set of weights being a contextual score between the model term and each support feature in the set of support features, each contextual score being based on a contextual correlation between the model term and each support feature in the set of support features wherein a high correlation would indicate high contextual relevance and a low correlation would indicate low contextual relevance;
 wherein each support feature in the set of support features corresponds to a weight in a second set of weights, each weight in the second set of weights being a co-occurrence score between the model term and each support feature in the set of support features, each co-occurrence score indicating a frequency of the model term occurring with each support feature in the set of support features;
 applying the context model to the given text object; and
 obtaining a context model score from the application of the context model to the given text object, wherein the context model score indicates the likelihood of the model term being contextually related to the given text object.

16. The physical computer readable medium of claim 15, wherein the first text object comprises at least one keyword.

17. The physical computer readable medium of claim 15, wherein the model term comprises at least one phrase.

18. The physical computer readable medium of claim 15, wherein the context model set of support features comprises at least one term.

19. The physical computer readable medium of claim 15, wherein the set of support features comprises multiple terms.

20. The physical computer readable medium of claim 15, wherein the set of support features comprises at least one phrase.

21. The physical computer readable medium of claim 15, wherein the set of support features comprises multiple phrases.

22. The physical computer readable medium of claim 15, wherein the set of support features comprises at least one keyword and at least one phrase.

23. The physical computer readable medium of claim 15, further comprising retrieving at least one document based on the computed similarity.

24. The physical computer readable medium of claim 15, further comprising ranking the retrieved documents based on the computed similarity.

25. A physical computer readable medium storing a computer programming product causing a computer to execute a process for automatic induction of a context model for a model term, the process comprising:

a. selecting a feature set to contain only a feature for the model term with no context;
b. setting an initial weight to one for the feature;
c. updating the weight for the feature; and
d. performing feature induction; and
e. creating a context model comprising a relationship of a set of support features and multiple sets of weights wherein each support feature in the set of support features corresponds to a weight in a first set of weights, each weight in the first set of weights indicating a contextual score between the model term and each support feature in the set of support features, each contextual score being based on a contextual correlation between the model term and each support feature in the set of support features, wherein a high correlation would indicate high contextual relevance and a low correlation would indicate low contextual relevance;

wherein each support feature in the set of support features corresponds to a weight in a second set of weights, each weight in the second set of weights being a co-occurrence score between the model term and each support feature in the set of support features, each co-occurrence score indicating a frequency of the model term occurring with each support feature in the set of support features;

wherein the updating the weight in the first set of weights for the feature comprises:
  i. calculating a gradient and adjusting the initial weight a small step in a direction of the gradient; and
  ii. repeating (a) until a predetermined condition is met.

26. The physical computer readable medium of claim 25, wherein the performing the feature induction comprises:
  i. enumerating a set of candidate features;
  ii. computing an optimal weight for each of the set of the candidate features;
  iii. computing an information gain for each of the set of the candidate features, by adding each of the set of the candidate features to the feature set;
  iv. picking a candidate feature of the set of the candidate features, which yields a highest gain, and adding the candidate feature to the feature set;
  v. returning to step (c), until a predetermined condition is met.

\* \* \* \* \*